United States Patent [19]

Reiner et al.

[11] 4,269,621

[45] May 26, 1981

[54] USE OF HEAVY METAL CHELATES OF 2-MERCAPTOPYRIDINE-N-OXIDE TO SEPARATE SELECTED PRECIOUS METALS FROM ACIDIC SOLUTIONS

[75] Inventors: Joseph R. Reiner, Northford; Sigmund Breister, Hamden, both of Conn.

[73] Assignee: Olin Corporation, New Haven, Conn.

[21] Appl. No.: 115,163

[22] Filed: Jan. 24, 1980

[51] Int. Cl.³ ............................................. C22B 11/04
[52] U.S. Cl. ............................ 75/101 BE; 75/118 R; 75/118 P; 75/121; 423/22; 423/24
[58] Field of Search ........... 546/6; 75/101 BE, 118 R, 75/118 P, 120, 121; 423/22, 24

[56] References Cited

U.S. PATENT DOCUMENTS

| | | | |
|---|---|---|---|
| 3,473,921 | 10/1969 | Schmuckler | 75/118 R |
| 3,755,161 | 8/1973 | Yokota et al. | 210/36 |
| 3,992,506 | 11/1976 | Hooks et al. | 423/42 |
| 4,097,272 | 6/1978 | Rappas et al. | 423/139 |
| 4,148,813 | 4/1979 | Rappas et al. | 75/101 BE X |

OTHER PUBLICATIONS

Edrissi et al., *Microchemical J.*, vol. 15, pp. 579–584 (1970); vol. 16, pp. 177–183 and 538–547 (1971).
Dalziel et al., *Analyst*, vol. 89, pp. 707–712 (1964).
Olin Industrial Biocides Product Data Bulletin for Zinc Omadine and Sodium Omadine (1978).
Hampel, Rare Metals Handbook, Reinhold Publ. Corp., pp. 295–301, 1956.

*Primary Examiner*—G. Ozaki
*Attorney, Agent, or Firm*—William A. Simons; Thomas P. O'Day

[57] ABSTRACT

Disclosed is a process for separating precious metals such as gold or platinum from acidic solutions having a pH below about 3, which comprises the steps of:

(a) adding a sufficient amount of a heavy metal chelate (e.g., zinc or iron) of 2-mercaptopyridine-N-oxide to the acidic solution to cause at least a portion of the precious metals in the solution to transchelate with the heavy metal chelate of 2-mercaptopyridine-N-oxide and then to form precipitates in the solution; and (b) separating the precipitated precious metal chelates of 2-mercaptopyridine from the acidic solution.

17 Claims, No Drawings ic solutions to transchelate with the
USE OF HEAVY METAL CHELATES OF 2-MERCAPTOPYRIDINE-N-OXIDE TO SEPARATE SELECTED PRECIOUS METALS FROM ACIDIC SOLUTIONS

BACKGROUND OF THE INVENTION

1. Field of the Invention

The present invention relates to a process for removing precious metals from strongly acidic solutions like manufacturing and waste solutions.

2. Description of the Prior Art

At the present time, the known methods of recovering precious metals such as gold, platinum and palladium from strongly acidic manufacturing solutions and waste solutions are usually very time-consuming and involve a number of processing steps. As an illustration of such processes, see pages 298–299 of Hampel, C. A., *Rare Metals Handbook,* Reinhold Publishing Company (1956) which show one such multi-step recovery process. In essence, these methods of recovering precious metals from acidic solutions resemble quantitative analysis procedures employed in laboratories.

Furthermore, these procedures are not very efficient when employed on large commercial scales. Also, the difficulty of recovery is always increased when more than one precious metal is present in the acidic solution, or when base metals like iron, copper or tin are additionally present.

Still further, the loss of precious metal values is tolerated in some operations rather than having to transport these strongly acidic solutions to suitable metal recovery facilities. Such transportation is costly and may be hazardous. Accordingly, there is a need in the art of precious metal recovery for a means for easily, efficiently and selectively removing precious metals from strongly acidic solutions. The process of the present invention offers a solution to that need.

Separately, it is known that the zinc chelate of 2-mercaptopyridine-N-oxide will transchelate with other metal ions like iron, copper, mercury and silver. See Olin Corporation Zinc Omadine ® and Sodium Omadine ® Product Data Bulletin (1978). Further, it is also known that the ferric chelate of 2-mercaptopyridine-N-oxide will transchelate with mercury and this reaction is useful for the analytical determination of mercury in solutions. See Edrissi, M., et al; *Microchemical Journal,* Vol. 15, pages 579–584 (1970). Also, it is known that sodium salt of 2-mercaptopyridine-N-oxide is a selective absorptiometric reagent for the determination of palladium in an alkaline solution and in the presence of masking agents. See Edrissi, M., et al; *Microchemical Journal,* Vol. 16, pages 177–183 (1971). Still further, U.S. Pat. No. 3,992,506 teaches that alkali metal (e.g., sodium) salts of 2-mercaptopyridine-N-oxide will react with silver in waste plating solutions and form the water insoluble silver salt of 2-mercaptopyridine-1-oxide and this precipitate can be separated from the solution.

BRIEF SUMMARY OF THE INVENTION

Accordingly, the present invention is directed to a process for separating precious metals like gold, platinum, palladium, and rhodium from acidic solutions having a pH below about 3 which comprises the steps of:

(a) adding a sufficient amount of a heavy metal chelate (e.g., zinc or iron) of 2-mercaptopyridine-N-oxide to the acidic solution to cause at least a portion of the precious metals in the solution to transchelate with the heavy metal chelate and then to form precipitates in the solution; and (b) separating the precipitated precious metal chelates of 2-mercaptopyridine-N-oxide from the acidic solution.

Acidic solutions which may be treated by this process include process and waste solutions from either electroplating, etching, metal refining or photographic processes.

After the precipitated precious metal chelates of 2-mercaptopyridine-N-oxide are separated from the acidic solution by the above process, the precious metals may be recovered in their metallic form by pyrolysis or by conventional solvent extraction techniques.

DETAILED DESCRIPTION

Suitable precious metals which may be easily, efficiently, and selectively removed by the present invention from strongly acidic solutions include gold, platinum, palladium, rhodium, ruthenium, osmium and iridium, or combinations thereof. Because of economic considerations, the present invention is preferably employed to remove gold, platinum, palladium, and rhodium or combinations thereof from these acidic solutions. More preferable, the present invention may be used to remove either gold, platinum, or rhodium alone from acidic solutions.

Generally, strongly acidic solutions which may be treated by the process of the present invention contain from about 2 parts per million parts (ppm) by weight up to about 20% by weight precious metals. Preferably, the amount of precious metals may be from about 10 ppm by weight to about 10% by weight of the solution; more preferably, from about 50 ppm by weight to about 5% by weight.

Suitable heavy metal chelates of 2-mercaptopyridine-N-oxide which may be employed include the zinc, iron, copper, aluminum, mercury, lead, tin, and nickel chelates of 2-mercaptopyridine-N-oxide. The zinc and iron chelates are preferred, the zinc chelate most preferred, at the present time because they are commercially available products.

Any strongly acidic solution which has a pH less than about 3.0 and contains any of the above-named precious metals may be employed in the process of the present invention. More preferably, it would be desirable to treat any acidic solution which has a pH in the range from less than 1 to about 2. This would include any concentrated solution of strong mineral acids like sulfuric acid, hydrochloric acid, nitric acid, and mixtures thereof like aqua regia. The most preferable acidic solution to be treated by the present invention is aqua regia because it is commonly used in the dissolving or refining of precious metals.

The amount of heavy metal chelates of 2-mercaptopyridine-N-oxide added to the acidic solution must be sufficient to react with and cause precipitation of at least a portion of the precious metals contained in the acidic solution. More preferably, the amount of the heavy metal chelate added should be sufficient to cause precipitation of at least a major portion (i.e., about 50% by weight) of the precious metals in the solution. Most preferably, the amount of heavy metal chelate added should be sufficient to cause precipitation of at least 90% by weight of the precious metals.

The desired amount of heavy metal chelate to be added to the acidic solution can be determined by first assaying the solution for its precious metal content and then determining the mole equivalents of heavy metal chelates of N-mercaptopyridine-N-oxide necessary to react the precious metals in the solution. From this mole equivalent amount, the proper weight of the heavy metal chelate to be added may be determined. In the case where the zinc chelate of 2-mercaptopyridine-N-oxide is to be added and the precious metal to be removed is gold, the mole equivalents of the chelate to be added may be determined according to the following equation:

$$3Zn(M)_2 + 2Au^{+3} \rightarrow 2Au(M)_3 + 3Zn^{+2}$$

wherein M represents a single 2-mercaptopyridine-N-oxide moiety. In other words, 1.5 moles of the zinc chelate of 2-mercaptopyridine-N-oxide is one molar equivalent when 1 mole of gold is present in the acidic solution. Similar equations may be used for determining the molar equivalents when other heavy metal chelates are used or when other precious metals are to be recovered.

Preferably, it is desirable to add about 0.5 to about 5 mole equivalents of the heavy metal chelates for each mole of the total precious metals present in the solution. More preferably, it is desirable to add from about 0.8 to about 2.0 mole equivalents of the heavy metal chelate. Most preferably, it is desirable to add about 1.0 to about 1.5 mole equivalents of the heavy metal chelates.

The mode of adding the heavy metal chelates into the solution or the time of the reaction and precipitation after this addition are not critical factors to the present invention. Any conventional addition means may be employed. Preferably, it is desirable to allow the reaction to proceed for a time period of about 3 minutes to about 120 minutes, more preferably, from about 5-30 minutes, from the addition of the heavy metal chelates to the removal of the precious metal precipitates. Of course, the optimum reaction time will depend upon the specific heavy metal chelate, precious metals and acidic solution involved, along with many other factors. In the case where aqua regia is the acidic solution, the addition of the heavy metal chelates may cause the evolution of nitrous oxide fumes. Accordingly, the removal of the precious metal precipitates preferably should not begin until that evolution has substantially stopped.

In some situations where the precious metal content of the acidic solution is relatively high, it may be preferable to add water to dilute the solution before the addition of the heavy metal chelates. The water dilution before addition of the heavy metal chelate is desirable because otherwise the reaction mixture may become too thick by the addition of the heavy metals and the reaction may be inhibited or retarded. Accordingly, it may be preferable to dilute the acidic solution with water by 10% by weight up to 1000% by weight, or even more if necessary.

However, it should be remembered that the amount of water added to the solution should not be so much so as to change the pH of the resulting diluted acidic solution to above about 3.0. In the case of very strong acidic solutions like concentrated solutions of aqua regia, water dilution is not going to change the pH appreciably unless an extremely large amount of water is added.

Also, it is preferred to agitate the reaction mixture during and after the addition of the heavy metal chelates to ensure substantially complete reaction. Any conventional means of agitating strong acidic solutions may be used. Stirring may be one suitable means.

Other reaction parameters like reaction temperatures and pressures are also not seen to be critical to the present invention. Preferably, the present process may be carried out at temperatures from about 0° C. to about 100° C.; preferably, from about 20° C. to about 50° C. The most preferred temperature is at room or ambient temperature because no cooling or heating means may then be needed. Likewise, the present process may be carried out at atmospheric or superatmospheric pressures; but it is normally advantageous to use atmospheric pressure because no pressured equipment will then be needed.

The step of separating the precipitated precious metal chelates may be carried out by any conventional solid/liquid separation means. Suitable examples include filtration, decanting, centrifugation and the like. Of course, it should be remembered that strong acidic solutions are involved and that the separation means should be compatible with such strong acids.

After the precipitated precious metal chelates are separated from the acidic solution, the precious metals may be recovered in their metallic form by any conventional method. For example, if only one precious metal is present, it may be desired to recover the metal values simply by pyrolysis (i.e., burning) of this chelate.

The use of selected heavy metal chelates of 2-mercaptopyridine-N-oxide to recover precious metal from strongly acidic solutions is surprising for several reasons. First, it is unexpected that the resulting precious metal chelates are stable at such extremely low pH levels. Also, it is surprising that the heavy metal chelates will so readily transchelate with precious metals. In fact, the relatively fast reaction rate of the present invention makes it practical for commercial usage, whereas the reaction rate between the sodium salt of 2-mercaptopyridine-N-oxide and various precious metals in such strongly acidic solutions are much slower (see Comparison 1, below). And further, the selective transchelation and precipitation of precious metals instead of other base metals that may be present in the solution is unexpected.

Besides adding the above-noted heavy metal chelates of 2-mercaptopyridine-1-oxide, the present invention also contemplates the use of corresponding derivatives of the heavy metal chelates of 2-mercaptopyridine-N-oxide wherein the pyridine ring has one or more inert substituents attached to the pyridine ring like 3-, 4-, 5-, and 6-methyl derivatives.

The following Examples are given to further illustrate the present invention. All parts and percentages are by weight unless explicitly stated otherwise.

EXAMPLE 1

A waste solution of aqua regia used for metal etching was analyzed and the gold, platinum and palladium concentrations were found to be the following:
Au: 3.88 grams per 50 ml of aqua regia solution
Pd: 1.55 grams per 50 ml of aqua regia solution
Pt: 1.48 grams per 50 ml of aqua regia solution As determined by emission spectroscopy, the waste solution was also found to contain minor amounts of silver and copper, along with traces of silicon, iron, ruthenium, calcium, lead, chromium, magnesium, tin, aluminum, zinc and sodium. These metals were not analyzed to determine their exact concentration.

50 ml of this aqua regia solution was diluted with 50 ml of distilled water and then 35.5 grams of zinc 2-mercaptopyridine-N-oxide (approximately 1.7 times the stoichiometric amount needed to react with the Au, Pd and Pt) was added to the diluted solution while the reaction mixture was being stirred. The mixture was stirred for 30 minutes after the addition of the zinc 2-mercaptopyridine-N-oxide; the stirring was done with a magnetic stirrer. Stirring was reasonably vigorous. After this stirring time, the reaction mixture was immediately filtered through Whatman No. 1 qualitative filter paper; the filtrate was then analyzed to determine the remaining concentration, if any, of Au, Pd and Pt. These were determined by atomic absorption and found to be as follows:

Au: 0.0007 gram per 100 mls of filtrate
Pd: <0.002 gram per 100 mls of filtrate
Pt: 0.01 gram per 100 mls of filtrate The following percentages were calculated to show the relative amounts of these three precious metals that were removed from the aqua regia solution and could be recovered from the filtered solids:

$$\text{Au: } \frac{0.0007 \text{ grams}}{3.88 \text{ grams}} = 0.018\% \text{ or } 99.982\% \text{ recovered in filtered solids}$$

$$\text{Pd: } \frac{<0.002 \text{ grams}}{1.55 \text{ grams}} = 0.125\% \text{ or } 99.87\% \text{ recovered in filtered solids}$$

$$\text{Pt: } \frac{0.01 \text{ grams}}{1.48 \text{ grams}} = 0.675\% \text{ or } 99.32\% \text{ recovered in filtered solids}$$

EXAMPLE 2

The procedure of Example 1 was repeated to confirm the results. Another sample of this aqua regia solution was reassayed and the following results were obtained:

Au: 4.035 grams per 50 ml of aqua regia solution
Pd: 1.44 grams per 50 ml of aqua regia solution
Pt: 1.055 grams per 50 ml of aqua regia solution Again, 50 ml of the aqua regia solution was diluted with 50 ml of distilled water and then 40.9 grams of zinc 2-mercaptopyridine-N-oxide (approximately 1.9 times the stoichiometric equivalent needed to react with the Au, Pd, and Pt in the solution) while stirring the reaction mixture. The mixture was then again stirred for 30 minutes after the addition of the zinc 2-mercaptopyridine-N-oxide.

After the stirring was completed, the reaction mixture was also immediately filtered through a Whatman No. 1 qualitative filter paper; and the filtrate was analyzed to determine the remaining concentration, if any, of Au, Pd, and Pt. These were determined to be as follows:

Au: 0.00346 grams per 100 ml of filtrate
Pd: 0.00029 grams per 100 ml of filtrate
Pt: 0.0045 grams per 100 ml of filtrate The relative amounts of these three precious metals that were removed from aqua regia solution were calculated as follows:

$$\text{Au: } \frac{0.00346 \text{ g.}}{4.035 \text{ g.}} = 0.08\% = 99.92\% \text{ recovered in filtered solids}$$

$$\text{Pd: } \frac{0.00029 \text{ g.}}{1.44 \text{ g.}} = 0.020\% = 99.98\% \text{ recovered in filtered solids}$$

$$\text{Pt: } \frac{0.0045 \text{ g.}}{1.005 \text{ g.}} = 0.45\% = 99.55\% \text{ recovered in filtered solids}$$

Therefore, Examples 1 and 2 taken together show the reproducibility of this invention.

EXAMPLE 3

25 ml of the same aqua regia solution as was employed in Example 2 was diluted with 25 ml of distilled water. Next, 8.8 grams of ferric 2-mercaptopyridine-N-oxide (approximately 91.4 percent of the stoichiometric equivalent needed to react with Au, Pd, and Pt in the aqua regia) were added to the diluted solution over a 10 minute period while stirring the mixture. Afterwards, the mixture was stirred for one and one-half hours with a magnetic stirrer. The reaction mixture was then filtered and assayed for Au, Pd, and Pt as in the previous Examples.

The results of the assay showed the following:
Au: 0.0002 grams per 50 ml of filtrate
Pd: <0.005 grams per 50 ml of filtrate
Pt: 0.1345 grams per 50 ml of filtrate The following percentages were then calculated to show the relative amounts of these three precious metals that were removed from the aqua regia solution and could be recovered from the filtered solids:

The results of the assay showed the following:

$$\text{Au: } \frac{0.0002 \text{ gms}}{2.0175 \text{ gms}} = 0.0099\% = 99.99\% \text{ recovered in filtered solids}$$

$$\text{Pd: } \frac{<0.005 \text{ gms}}{0.720 \text{ gms}} = <0.694\% = >99.3\% \text{ recovered in filtered solids}$$

$$\text{Pt: } \frac{0.1345 \text{ gms}}{0.5025 \text{ gms}} = 26.77\% = 73.23\% \text{ recovered in filtered solids}$$

EXAMPLE 4

25 mls of the same aqua regia solution assayed in Example 2 was mixed with 8.0 grams of ferric 2-mercaptopyridine-N-oxide (approximately 83 percent of the stoichiometric amount needed to react with the Au, Pd, and Pt in the aqua regia). No water dilution was employed. The reaction was again quick and after a half-hour of stirring, the mixture was filtered through Whatman No. 1 qualitative filter paper. The filtrate was then assayed, giving the following values:

Au: 0.000175 grams per 50 ml of filtrate
Pd: 0.0000625 grams per 50 ml of filtrate
Pt: 0.047 grams per 50 ml of filtrate The following percentages were then calculated to show the relative amounts of these three precious metals that were removed from the aqua regia solution and could be recovered from the filtered solids:

$$\text{Au: } \frac{0.000175 \text{ gms}}{2.0175 \text{ gms}} = 0.00867\% \text{ or } 99.99\% \text{ recovered in filtered solids}$$

$$\text{Pd: } \frac{0.0000625 \text{ gms}}{0.720 \text{ gms}} = 0.00868\% \text{ or } 99.99\% \text{ recovered in filtered solids}$$

$$\text{Pt: } \frac{0.047 \text{ gms}}{0.5025 \text{ gms}} = 9.35\% \text{ or } 90.65\% \text{ recovered in filtered solids}$$

The stoichiometric amount of ferric 2-mercaptopyridine-N-oxide was approximately 17 percent less than that amount calculated to be theorically necessary for a complete precipitation of all of the precious metals.

COMPARISON

This comparison shows a problem encountered when the sodium salt of 2-mercaptopyridine-N-oxide was used instead of a base heavy metal chelate of 2-mercaptopyridine-N-oxide.

50 mls of the same aqua regia solution employed in Examples 2-4 was used. 110 grams of a 40% aqueous solution of sodium 2-mercaptopyridine-N-oxide (i.e., 44 grams of the sodium salt) was added over a period of approximately one-half hour, with stirring. The reaction mix was filtered using Whatman No. 1 qualitative filter paper. 44 grams of sodium 2-mercaptopyridine-N-oxide is approximately 221% of the stoichiometric amount needed to react with the Au, Pd, and Pt in the aqua regia.

The reaction did not proceed as quickly and cleanly as those in Examples 2-4 as the filtrate began to precipitate more solids after 15 minutes standing. This precipitate was pink colored and assayed at 2.5% palladium, 0.5% gold and 0.23% platinum. After filtering these solids off, additional solids formed over a period of one to two days. These were assayed and found to contain Pt (0.86%), Pd (<0.15%), and Au (0.44%). The final filtrate assayed as follows:

Au: 0.007 grams per 100 ml of filtrate
Pd: 0.0117 grams per 100 ml of filtrate
Pt: 0.0968 grams per 100 ml of filtrate The following percentages were then calculated to show the relative amounts of these three precious metals that were removed from the aqua regia solution and could be recovered from the filtered solids:

Au: $\frac{0.007 \text{ grams}}{4.035 \text{ grams}} = 0.173\% = 99.826\%$ finally recovered from the solution Pd: $\frac{<0.0117 \text{ grams}}{1.44 \text{ grams}} = <0.812\% = 99.188\%$ finally recovered from the solution Pt: $\frac{0.0968 \text{ grams}}{1.055 \text{ grams}} = 10.899\% = 89.101\%$ finally recovered from the solution It can be seen that while sodium 2-mercaptopyridine-N-oxide may be used to recover precious metals such as Au, Pd and Pt, the reaction is much more time consuming (period of 2-3 days is 30 minutes) and much less precise. In all, this prolonged filtration would be impractical and uneconomical for commercial employment on large scales.

What is claimed is:

1. A process for separating precious metals selected from the group consisting of gold, platinum, palladium, rhodium, iridium, osmium, and ruthenium from acidic solutions having a pH below about 3, which comprises the steps of:
    (a) adding a sufficient amount of at least one heavy metal chelate of 2-mercaptopyridine-N-oxide, wherein said heavy metal chelates are selected from the group consisting of zinc, iron, copper, aluminum, mercury, lead, tin, and nickel, to said acidic solution to cause at least a portion of said precious metals in said acidic solution to transchelate with the heavy metal chelate of 2-mercaptopyridine-N-oxide and to form precipitates in said acidic solution; and
    (b) separating said precipitated precious metal chelates of 2-mercaptopyridine-N-oxide from said acidic solution.

2. The process of claim 1 wherein the precious metals in said separated precipitated precious metal chelates of 2-mercaptopyridine-N-oxide are later recovered in their metallic form.

3. The process of claim 1 wherein said heavy metal chelate of 2-mercaptopyridine-N-oxide is the zinc chelate.

4. The process of claim 1 wherein said heavy metal chelate of 2-mercaptopyridine-N-oxide is the iron chelate.

5. The process of claim 1 wherein at least a major portion of said precious metals in said acidic solution are transchelated and precipitated.

6. The process of claim 1 wherein the amount of heavy metal chelate of 2-mercaptopyridine-N-oxide added is in the range from about 0.5 to about 5.0 molar equivalents needed to transchelate with one mole of said precious metals in said solution.

7. The process of claim 1 wherein said acidic solution is aqua regia.

8. The process of claim 1 wherein said precious metals comprise gold, platinum, palladium and rhodium.

9. A process for separating precious metals selected from the group consisting of gold, platinum, palladium, and rhodium from acidic solutions having a pH below about 3, which comprises the steps of:
    (a) adding a sufficient amount of heavy metal chelate of 2-mercaptopyridine-N-oxide, said heavy metal chelate selected from the group consisting of zinc and iron, to said acidic solution to cause at least a major portion of said precious metals in said acidic solution to transchelate with said heavy metal chelate and to form precipitates in said acidic solutions; and
    (b) separating said precipitated precious metal chelates of 2-mercaptopyridine from said acidic solution.

10. The process of claim 9 wherein the precious metals in said separated precipitated precious metal chelates are recovered in their metallic form.

11. The process of claim 9 wherein said heavy metal chelate is the zinc chelate.

12. The process of claim 9 wherein said heavy metal chelate is the iron chelate.

13. The process of claim 9 wherein at least 90% by weight of said precious metals in said acidic solution are transchelated and precipitated.

14. The process of claim 9 wherein the amount of heavy metal chelate of 2-mercaptopyridine-N-oxide added is in the range from about 0.8 to about 2.0 molar equivalents needed to transchelate with one mole of said precious metals in said acidic solution.

15. The process of claim 9 wherein the amount of heavy metal chelate of 2-mercaptopyridine-N-oxide added is in the range from about 1.0 to about 1.5 molar equivalents needed to transchelate with one mole of said precious metals in said acidic solution.

16. The process of claim 9 wherein said acidic solution is aqua regia.

17. The process of claim 9 wherein said precious metals comprise gold, platinum and rhodium.

* * * * *